United States Patent

Oetjen

[11] Patent Number: 6,101,891
[45] Date of Patent: Aug. 15, 2000

[54] DEVICE FOR CONVERTING A ROTATIONAL MOVEMENT INTO AN AXIAL MOVEMENT

[75] Inventor: Jürgen Oetjen, Herzogenaurach, Germany

[73] Assignee: INA Wälzlager Schaeffler oHG, Herzogenaurach, Germany

[21] Appl. No.: 09/242,511
[22] PCT Filed: Sep. 15, 1997
[86] PCT No.: PCT/EP97/05025
  § 371 Date: Feb. 17, 1999
  § 102(e) Date: Feb. 17, 1999
[87] PCT Pub. No.: WO98/21505
  PCT Pub. Date: May 22, 1998

[30] Foreign Application Priority Data

Nov. 9, 1996 [DE] Germany .......................... 196 46 351

[51] Int. Cl.⁷ ................................................. F16H 19/02
[52] U.S. Cl. ......................................................... 74/424.8 C
[58] Field of Search ...................... 74/424.8 C, 459, 74/424.8 R

[56] References Cited

U.S. PATENT DOCUMENTS

| | | |
|---|---|---|
| 511,679 | 12/1893 | Buckley . |
| 2,488,256 | 11/1949 | Anderson ............... 74/424.8 C |
| 3,744,332 | 7/1973 | Nilsson ................. 74/424.8 C |
| 4,074,586 | 2/1978 | Nussbaum .............. 74/424.8 C |
| 4,884,466 | 12/1989 | Duruisseau ............ 74/424.8 C |

FOREIGN PATENT DOCUMENTS

| | | |
|---|---|---|
| 36 190 | 8/1988 | Australia . |
| 0 003 802 | 9/1979 | European Pat. Off. . |
| 02 29 744 A1 | 7/1987 | European Pat. Off. . |
| 0 320 621 | 6/1991 | European Pat. Off. . |
| 19 22 816 | 6/1965 | Germany . |
| 19 22 303 | 8/1965 | Germany . |
| 25 02 052 | 10/1975 | Germany . |
| 25 02 052 C2 | 10/1975 | Germany . |
| 25 40 348 C2 | 3/1977 | Germany . |
| 92 13 640 U | 3/1993 | Germany . |

*Primary Examiner*—Sherry L. Estremsky
*Attorney, Agent, or Firm*—Henry M. Feiereisen

[57] ABSTRACT

Apparatus for converting a rotational motion into an axial motion, includes a threaded spindle (9), a sleeve (10) in concentric surrounding relationship to the spindle at a spacing thereto, and a plurality of axis parallel rollers (1, 5) arranged in the spacing, with each of the rollers being provided with a circumferential profile and meshing with the threaded spindle (9). According to the invention, each roller (1, 5) is axially supported with both its end faces via rolling bodies (19) on housing plates (14, 15) which are arranged in fixed rotative engagement within the sleeve (10).

5 Claims, 3 Drawing Sheets

|   | $t_1$ | $t_2$ |
|---|---|---|
| 1 | 0,800 | 0,300 |
| 2 | 0,7375 | 0,3625 |
| 3 | 0,6750 | 0,425 |
| 4 | 0,6125 | 0,4875 |
| 5 | 0,550 | 0,550 |
| 6 | 0,4875 | 0,6125 |
| 7 | 0,425 | 0,6750 |
| 8 | 0,3625 | 0,7375 |

DEVICE FOR CONVERTING A ROTATIONAL MOVEMENT INTO AN AXIAL MOVEMENT

FIELD OF THE INVENTION

The invention relates to an apparatus for converting a rotational motion into an axial motion, including a threaded spindle, a sleeve in concentric surrounding relationship to the spindle at a spacing thereto, and a plurality of axis parallel rollers arranged in the spacing, with each of the rollers being provided with a circumferential profile and meshing with the threaded spindle.

BACKGROUND OF THE INVENTION

A conventional apparatus of this type is disclosed in European Pat. No. 0 320 621 and includes a sleeve formed as spindle nut. The rollers have not only a fine groove profiling for engagement with a fine screw thread of the threaded spindle but have in addition a coarse profiling for engagement in coarse guide grooves of the sleeve. During rotation of the threaded spindle, the rollers thus roll within the sleeve in a planetary motion on the threaded spindle as well as on the sleeve. This construction is complex and has the drawback that the sleeve as nut must be designed with a great inner profiling and each of the rollers must be designed with a fine profiling and an additional coarse profiling.

SUMMARY OF THE INVENTION

The invention is based on the object to create a threaded drive which is easier to manufacture and to assemble, while improving the attainable efficiency and reducing the manufacturing costs.

This object is attained in accordance with the invention by providing housing plates arranged in fixed rotative engagement within the sleeve for supporting each roller on both its end faces via a rolling bodies. The rolling bodies for support of the rollers may be balls disposed in bearing tracks of the housing plates. The rollers provided with the track profile thus are supported at their end faces by the sleeve via the balls. The rollers are acted upon not only by an axial force but also by a radial force. As the support is realized by two hardened housing plates, the sleeve itself may be a soft component. This design eliminates the need for an expensive roller cage and affords sufficiently great grease spaces even for a great number of rollers. Thus, the maintenance periods can be extended. A particular advantage resides in the capability to make the rollers geometrically completely identical and to mount them in random sequence. The sleeve and both housing plates can be made in a particularly economical fashion through deep-drawing, punching and embossing.

On their sides distant to the rolling bodies, the housing plates may have flat ring surfaces which extend at a right angle to the longitudinal axis of the threaded spindle. The flat ring surfaces of the housing plates may be axially supported by the end face regions of the sleeve. The necessary pretension for the axial bearings of the rollers may be realized by arranging a disk spring between a sleeve collar on one end face and the adjoining housing plate.

The track depth of the bearing tracks for the balls of the rollers arranged sequentially in circumferential direction of the threaded spindle may change on the housing plates in correspondence to the pitch of the thread of the threaded spindle. Thus, both housing plates which are secured against rotation have ball bearing races which are embossed at different depths.

Unlike conventional roller-type threaded drives, the construction according to the invention has profiled rollers which are fixedly supported in the sleeve, i.e. the rollers do not orbit around the spindle during rotation of the threaded spindle and of the rollers in rolling contact therewith. The thread pitch of this threaded drive depends only on the threaded spindle.

BRIEF DESCRIPTION OF THE DRAWINGS

An exemplified embodiment of the invention will now be described in more detail with reference to the drawing, in which.

DETAILED DESCRIPTION OF THE DRAWINGS

Figure 1:
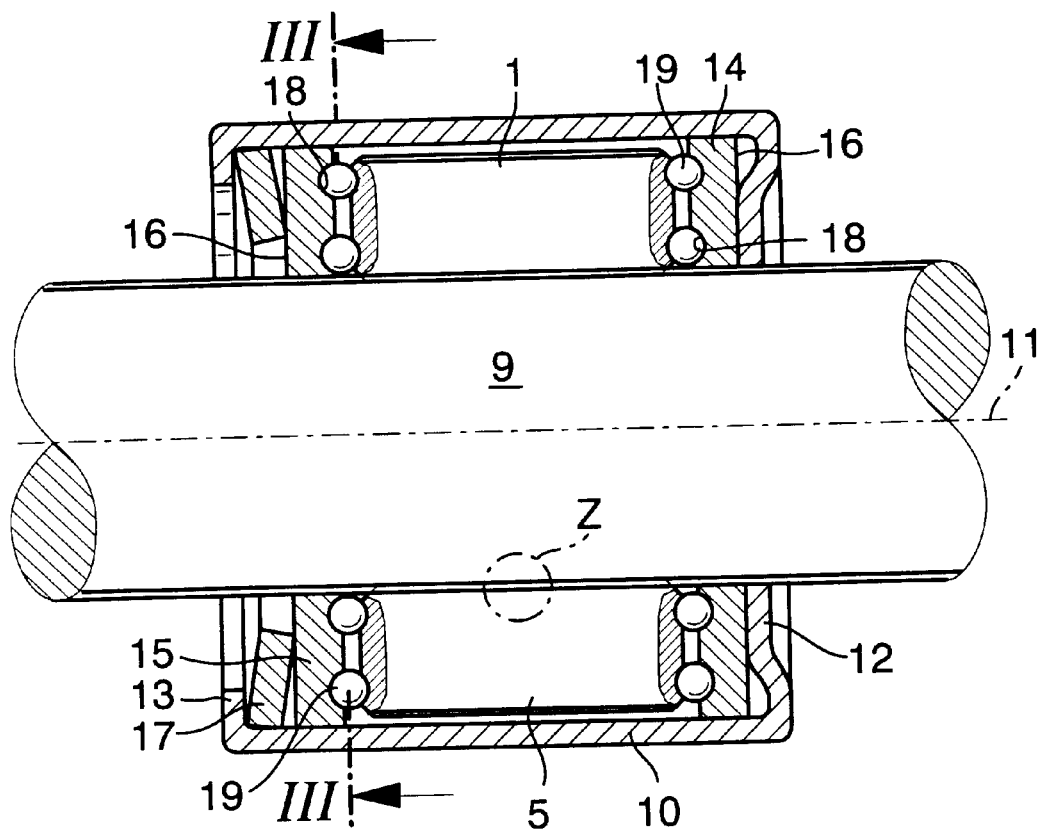
FIG. 1 is a longitudinal section through a roller-type threaded drive.
Figure 2:
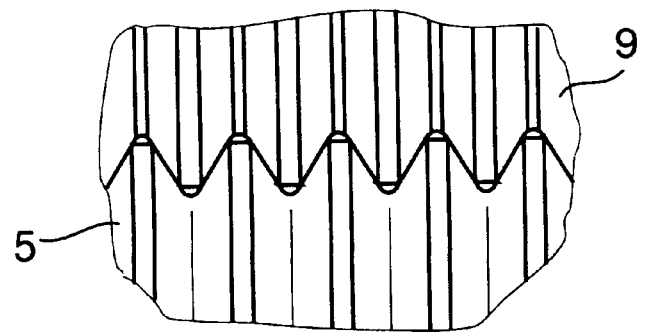
FIG. 2 the cutaway view Z of FIG. 1 of the engagement zone of a threaded spindle and a profiled roller, on an enlarged scale.

An apparatus for converting a rotational motion into an axial motion is configured as roller-type threaded drive with rollers 1 to 8 and includes a threaded spindle 9 which is concentrically surrounded by a sleeve 10. The inside diameter of the sleeve 10 is greater than the spindle diameter to thereby realize an annular space for accommodation of the rollers 1 to 8. In correspondence to the thread of the threaded spindle 9, the rollers 1 to 8 are provided with a grooved profile for mesh in the threaded spindle 9. The rollers 1 to 8 are arranged behind one another in circumferential direction of the threaded spindle 9, with their axes of rotation extending parallel to the longitudinal axis 11 of the threaded spindle 9.

The sleeve 10 has on one end face a bottom 12 which extends to the threaded spindle 9, and on the other end face a sleeve collar 13. Disposed within the sleeve are two housing plates 14 and 15 which surround the threaded spindle 9 in the form of the ring and provide an axial support of the rollers 1 to 8 within the sleeve 10. The housing plates 14 and 15 have flat ring surfaces 16 which extend perpendicular to the longitudinal axis 11 of the threaded spindle 9. The housing plate 14 is supported with its flat ring surface 16 by the bottom 12 of the sleeve 10, while the housing plates 15 is the supported with its flat ring surface 16 by a disk spring 17 which bears upon the inner side of the sleeve collar 13. On its sides distal to the flat ring surfaces and proximal to the inner side of the sleeve 10, the housing plates 14 and 15 are provided with bearing tracks 18 for rolling bodies in the form of balls 19 to realize axial bearings for the rollers 1 to 8. The end faces of the rollers 1 to 8 are supported in axial direction by the balls 19 and are also formed with bearing tracks.

The track depths $t_1$ of the housing plate 15 and $t_2$ of the housing plate 14 change in correspondence to the spindle pitch p of the threaded spindle 9 for sequential rollers 1 to 8. The difference of the track depths $\Delta t$ between the track depths $t_1$ and $t_2$ of two successive rollers does not only depend on the thread pitch p but also on the number of rollers z, whereby the following equation governs:

$\Delta t = p/z = 0.5 \text{ mm}/8 = 0.0625 \text{ mm}.$

Figures 3, 4:
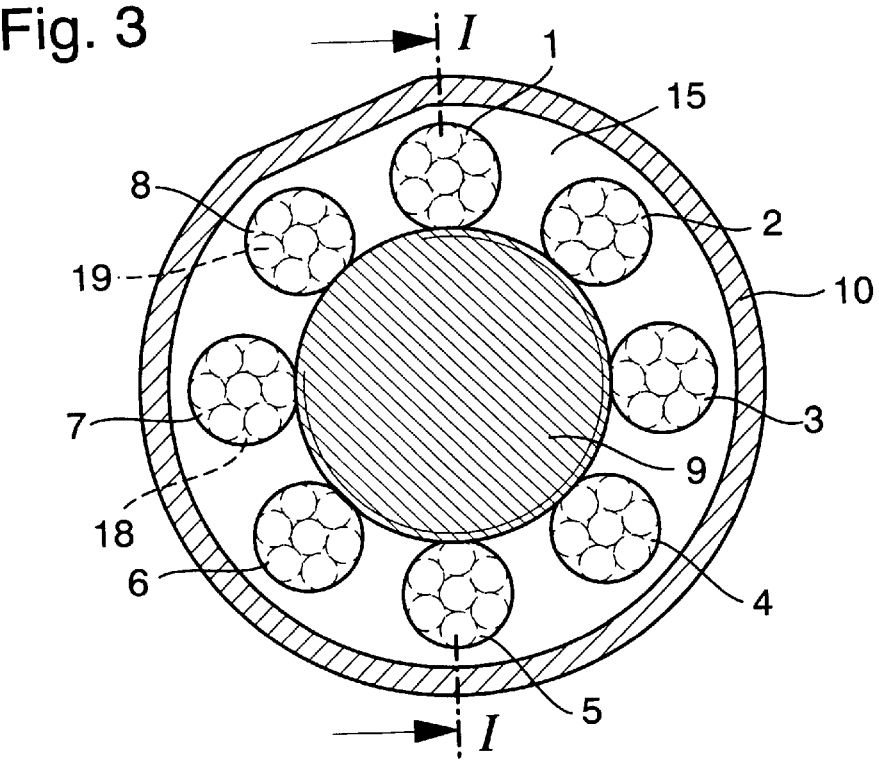
FIG. 3 a cross-section through the roller-type threaded drive, taken along the line III—III of FIG. 1.
FIG. 4 a table with data about the track depth of ball bearing tracks for the axial support of sequential rollers on housing plates.
Figure 5:
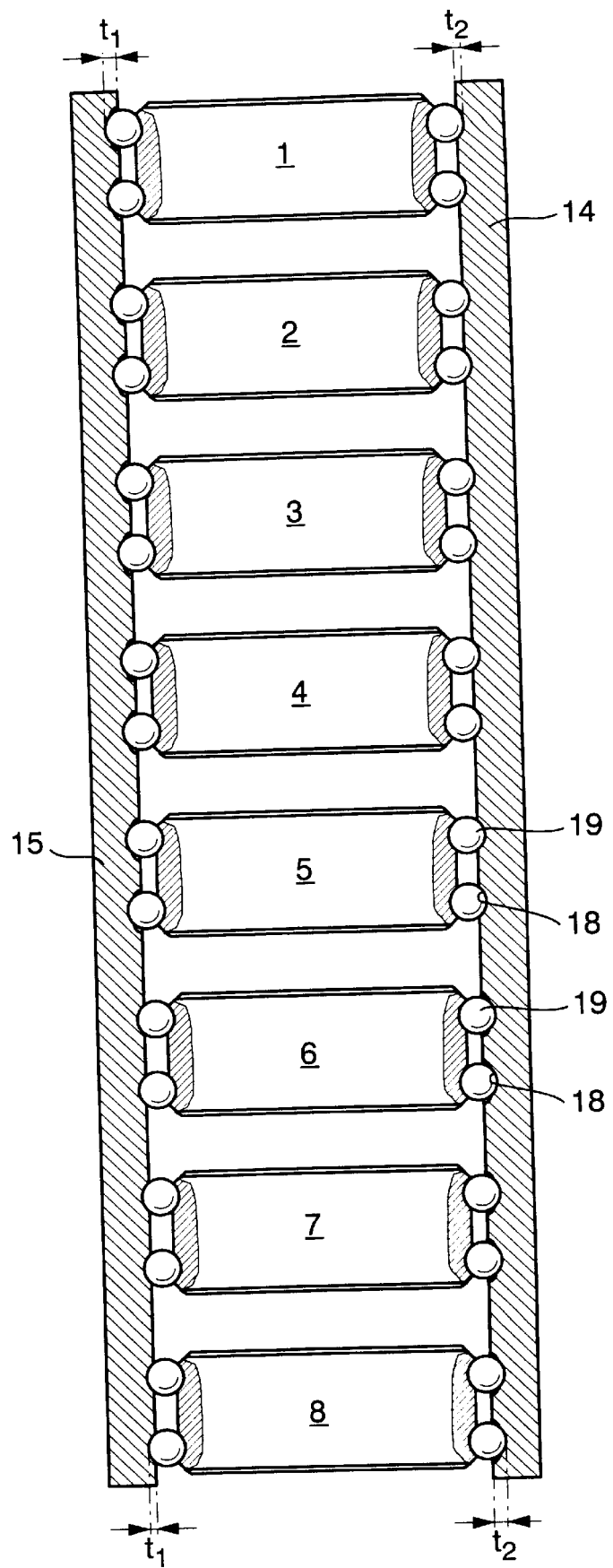
FIG. 5 a developed illustration of sequential rollers.

In the event of using a number of eight rollers according to the exemplified embodiment, the track depths $t_1$ and $t_2$ are listed in the table illustrated in FIG. 4. Column 1 indicates the number of rollers, and columns 2 and 3 list the track depths.

What is claimed is:

1. Apparatus for converting a rotational motion into an axial motion, comprising:

a threaded spindle defining a longituidnal axis;

a sleeve made through a deep-drawing process and concentrically surrounding the spindle in the form of a ring at a spacing thereto;

a plurality of rollers arranged parallel to the axis in the spacing and so configured as to mesh with the threaded spindle, each said roller having opposite end faces; and a bearing means for supporting the rollers in axial and radial directions, said bearing means including housing plates arranged in fixed rotative engagement within the sleeve, and rolling bodies in the form of balls disposed in bearing tracks of the housing plates, said rollers being supported by the housing plates via the rolling bodies.

2. The apparatus of claim 1 wherein the sleeve has one end face forming a collar, and further comprising a disk spring disposed between the collar (13) and the adjoining one of the housing plates.

3. The apparatus of claim 1 wherein the rollers are positioned sequentially in circumferential direction of the threaded spindle, said bearing tracks of the housing plates for the balls having a track depth which changes in correspondence to a pitch of the threaded spindle.

4. The apparatus of claim 1 wherein the housing plates have ball-distal sides in the form of flat ring surfaces which extend at a right angle to the longitudinal axis of the threaded spindle.

5. The apparatus of claim 4 wherein the flat ring surfaces of the housing plates are axially supported by confronting end faces of the sleeve.

* * * * *